United States Patent [19]

Aloia

[11] 4,093,599

[45] June 6, 1978

[54] PROCESS FOR THE PREPARATION OF VULCANIZABLE ELASTOMERS FROM THIODIETHANOL

[75] Inventor: Romeo Raymond Aloia, Bridgewater, N.J.

[73] Assignee: American Cyanamid Company, Stamford, Conn.

[21] Appl. No.: 779,115

[22] Filed: Mar. 18, 1977

[51] Int. Cl.$^2$ ............................................. C08G 75/12
[52] U.S. Cl. ..................................... 260/47 R; 260/79
[58] Field of Search ............................... 260/47 R, 79

[56] References Cited

U.S. PATENT DOCUMENTS 3,951,927  4/1976  Aloia ........................................ 260/79
3,985,708  10/1976 Chang et al. ......................... 260/47 R Primary Examiner—Lester L. Lee
Attorney, Agent, or Firm—Frank M. Van Riet

[57] ABSTRACT

A method for the preparation of elastomers from thiodiethanol. More particularly, the invention relates to an improved catalyst for the preparation of high molecular weight copolymeric elastomers from thiodiethanol.

15 Claims, No Drawings

PROCESS FOR THE PREPARATION OF VULCANIZABLE ELASTOMERS FROM THIODIETHANOL

This invention relates to a method for the preparation of elastomers from thiodiethanol. More particularly, the invention relates to an improved catalyst for the preparation of high molecular weight polymeric elastomers from thiodiethanol.

Thiodiethanol is a well-known diol, the hydroxyl groups of which exhibit unusual reactivity because of their positioning beta to a sulfur atom in an aliphatic chain. Under certain conditions, polymers of thiodiethanol are obtained which, when vulcanized, provide elastomers having excellent low temperature flexibility and outstanding resistance to hydrocarbon oils. Examples of such polymers, methods for their preparation, and elastomers produced therefrom are described in detail in my U.S. Pat. No. 3,951,927; and similar compositions are described by Chang et al. in U.S. Pat. No. 3,985,708. The disclosures of both the above patents are hereby incorporated herein by reference.

Therein, polymers are described which are obtained by heating thiodiethanol alone or in a major proportion i.e. at least about 50%, with one or more aliphatic diols under acid catalyzed dehydrating conditions to give polythioethers. The preferred acidic catalyst for the condensation reaction is phosphorous acid which, along with certain of its derivatives, is disclosed by Schmelzer et al., in U.S. Pat. No. 3,312,743, as providing polythioethers from thiodiethanol in high yields with minimal cyclic byproduct formation. Phosphorous acid is, indeed, an excellent polyetherification catalyst for the efficient preparation of low molecular weight, i.e., less than about 5000 molecular weight, oligomeric precondensates of polythiodiethanol and copolymers thereof, including compositions of the present invention. However, if the condensation reaction is continued in the presence of phosphorous acid in an attempt to attain a high molecular weight polymer or copolymer (elastomeric gum) suitable for conventional rubber processing into useful elastomers, it is found that the attainment of a high molecular weight is slow, even under the best conditions, i.e., using a high shear mixer at temperatures up to 200° C in vacuo. Moreover, yields are low. Such a process, obviously, is not attractive from a manufacturing standpoint.

As a result of the aforementioned shortcomings of phosphorous acid, considerable effort has been directed towards the discovery of a better process for the preparation of high molecular weight thiodiethanol polymers and copolymers, including better catalysts for the condensation reaction. None of the well-known acidic catalysts used in polyetherification reactions, such as hydrogen chloride, sulfuric acid, p-toluenesulfonic acid, sulfamic acid, and the like, are as effective in the early stages of the condensation reaction as phosphorous acid. These catalysts either are too slow or produce excessive quantities of cyclic by-product (primarily thioxane and dithiane), which results in low yields of oligomeric precondensate. This was recognized by Schmelzer et al., supra.

I have now discovered that high molecular weight elastomeric homopolymers and copolymers of thiodiethanol are readily obtained in high yields in a relatively short time if thiodiethanol is first condensed, in accordance with known procedures, under dehydrating conditions in the presence of phosphorous acid at a temperature above about 150° C to an oligomeric precondensate which is fluid at temperatures above about 100° C and has a molecular weight in the range of about 500 to 5000; and then the reaction is continued in the additional presence of from about 0.01 to 0.1 percent by weight of sulfuric acid at a temperature of 150° to 220° C and preferably at a pressure of less than about 50 mm Hg.

The effect of the addition of very small concentrations of sulfuric acid in the latter stages of the condensation reaction is surprising and totally unexpected, in view of the prior art disclosure of Schmelzer et al. and my experience with sulfuric acid catalysts in the initial stages of the condensation. Thus, whereas sulfuric acid affords undesirably high concentrations of cyclic by-products and, accordingly, low yields of polymeric products when used in the initial condensation, it has a very desirable effect in catalyzing the reaction when added during the latter stages of reaction, in that high molecular weight elastomeric gums are obtained in high yield in a short time.

The instant process comprises preparing linear, high molecular weight elastomeric polymers of thiodiethanol which comprises condensing a monomer charge comprising thiodiethanol alone or a major proportion of thiodiethanol with (A) one or more saturated or unsaturated aliphatic diols or (B) one or more dihydric phenolic compounds or (C) mixtures of (A) and (B), at a temperature of from about 150°–200° C in the presence of phosphorus acid until an oligomeric precondensate is obtained which is fluid at a temperature above about 100° C. Sulfuric acid is then added to the precondensate and the reaction is continued until a high molecular weight elastomeric gum is obtained.

More particularly, the vulcanizable elastomer compositions which can be produced by the process of the instant invention comprise those having either Formula A or B, Formula A comprising:

wherein +OG+ comprises randomly alternating structural units (I) and (II)

wherein R is one or more radicals which are the residues remaining on removal of two hydroxyl groups from diols selected from (a) saturated, linear, branched chain or cyclic diols, (b) linear, branched chain or cyclic diols containing external unsaturation in the form of a group having an allylic hydrogen atom or (c) mixtures of (a) and (b); being characterized in that (1) n is an integer sufficient to provide a molecular weight of at least about 8000, (2) the molar ratio of structural units (I) to structural units (II) is not less than 1 and, (3) in any event, said structural units +OG+ contain no more than about 10 mole percent of said external unsaturation and Formula B comprising

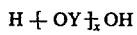

wherein + OY + comprises randomly alternating structural units (III), (IV), and, optionally, (V)

  (IV)

  (V)

wherein $R^1$ represents the residue remaining on removal of two phenolic hydrogen groups from a dihydric phenolic compound and $R^2$ represents one or more radicals which are the residues remaining on removal of two hydroxyl groups from diols selected from (d) saturated, linear, branched chain or aliphatic cyclic diols, (e) linear, branched chain or aliphatic cyclic diols containing external unsaturation in the form of a group having an allylic hydrogen atom or (f) mixtures of (d) and (e) being characterized in that (4) the ratio of structural units III to structural units IV, or optionally, to the total of structural units IV and V, is not less than 1, (5) x is an integer sufficient to provide a molecular weight of at least about 8000 and (6) in any event, said structural units $+OY+$ contains no more than about 10 mole percent of said external unsaturation.

Any aliphatic diol which will condense with aliphatic dicarboxylic acids, as for example in the preparation of aliphatic polyesters, will be suitable for the preparation of copolymers in accordance with the process of the present invention. The following list is merely representative of the diols which can be used, and the invention is not limited thereto. They include: ethylene glycol, propane-1,2-diol, propane-1,3-diol, butane-1, 4-diol, pentane-1,5-diol, hexane-1, 6-diol, diethylene glycol; cyclohexane di(lower alkylene) diols, such as cyclohexane 1,2-and 1,4-dimethanol, either cis or trans or mixtures thereof, cyclobutane di(lower alkylene) diols, such as cyclobutane-1,2-dimethanol, aralkylene diols, such as the bis(hydroxyethyl) ether of hydroquinone or resorcinol, the monoallyl ether of trimethylolpropane, the monoallyl ether of glycerol, 3-cyclohexene-1,1-dimethanol; bicyclic aliphatic diols, such as 5-morbornene-2,2-dimethanol, 5-morbornene-2,3-dimethanol etc.

Preferred saturated diols include diethylene glycol, butane-1,4-diol, bis(hydroxyethyl)ether of hydroquinone. Preferred unsaturated diols include monoallyl ether of trimethylolpropane, monoallyl ether of glycerol and 3-cyclohexene-1,4-dimethanol.

The expression "external unsaturation" as used herein refers to the position of the unsaturation in the diol molecule such that at least one continuous chain of atoms remains in the diol, extending between the two diol oxygen atoms, which chain does not include any carbon-to-carbon double bonds. The unsaturated diols enumerated above as preferred unsaturated diols are examples of diols containing external unsaturation having an allylic hydrogen atom.

Examples of dihydric phenolic compounds useful in the present process include (e) bisphenols of the general formula:

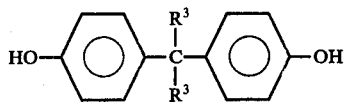

wherein the $R^3$'s may be the same or different and selected from hydrogen alkyl, or taken together with the carbon atom, combine to form a cycloalkylene bridge e.g. Bisphenol A (isopropylidene-bis phenol); dihydroxy aromatic compounds, such as hydroquinone, resorcinol, naphthalene diols, and the like; polymers of (a) or (b), for example, polyesters of hydroquinone with dibasic acids or polyethers of a bisphenol with epichlorohydrin, wherein the terminal groups or chain-ends are substantially phenolic residues, and the like.

The initial condensation reaction leading to the generally liquid, low molecular weight oligomeric precondensate is well-known and is disclosed in Schmelzer et al., and in my aforementioned patent and the patent of Chang et al. Essentially, the reaction is conducted at a temperature above about 150° C, preferably about 180°–200° C, in the presence of 0.01 to 3 percent by weight of phosphorous acid, preferably about 0.1 to 1 percent. The reaction is preferably conducted under a blanket of an inert gas, such as nitrogen, to prevent discoloration, with the water formed in the condensation being attained, as determined by measurement of the hydroxyl number by conventional means. A convenient method for monitoring the extent of reaction is to follow the change in ratio of methylene groups to hydroxyl groups in an infrared spectrum of the reaction mixture, with the ratio increasing with the molecular weight.

When the desired low molecular weight oligomeric precondensate is obtained, the reaction temperature may be reduced, if necessary, to about 170°–180° C, and about 0.01 to 0.1 percent by weight, preferably about 0.02 to 0.04 percent, of sulfuric acid is added thereto. The condensation is then continued at a temperature of about 150°–220° C, preferably about 170°–200° C, and preferably in vacuo, distilling water as formed. The pressure is not critical, but pressures less than about 50 mm Hg will greatly facilitate the removal of water. Since the second stage of the condensation is conducted to attain a high molecular weight elastomeric gum, it is preferable to conduct it under conditions of high shear to constantly expose more surface to reaction. I have found that a particularly suitable reactor is an Atlantic 2CV Reactor, sold by Atlantic Research Co., Gainsville, Va. This is a high shear mixer equipped with means for heating and application of vacuum. In the preferred method of operation the entire condensation reaction is conducted in the same reactor, preferably the Atlantic 2CV or a similar reactor. Of course, the initial condensation may be conducted in a separate reaction vessel and the reaction mixture then transferred to a suitable high shear mixture for continuation of the reaction. The mechanical means used to conduct the reaction are not critical and the process of this invention is not limited to any particular apparatus or combination thereof.

Depending on the molecular weight of the oligomeric precondensate, the reaction temperature, the concentration of sulfuric acid and the desired final molecular weight, reaction times may be 2 to 3 hours, or less, under optimum conditions, as opposed to reaction times of 15–20 hours heretofore.

If the second stage of the condensation is begun too soon, i.e., if the sulfuric acid is added to the precondensate before a suitable molecular weight is reached, excessive oily by-product may be produced. Accordingly, as described above, it is preferred to achieve a molecular weight in the initial condensation of at least about 500, preferably 1500 to 3000. On the other hand, if the second stage of reaction is delayed, i.e., if the molecular weight of the oligomeric precondensate significantly exceeds about 3000 before addition of sulfuric acid, the viscosity may be too high to effectively distribute the sulfuric acid homogeneously throughout the reaction mixture.

It is difficult to assess the molecular weight of a high molecular weight copolymer gum by any convenient conventional means, such as hydroxyl number, because of solubility problems and because the hydroxyl numbers are quite low. For these reasons the molecular weight of the gum is assessed by measuring its Mooney viscosity (ASTM Method D1646). The Mooney values increase with molecular weight and values in the range of about 25 to 50 are preferred because such gums are readily processed on conventional rubber equipment. Mooney values of at least about 10 are satisfactory, although the higher range is preferred. The Mooney values of the polymers may be increased by incorporation of small amounts of cross-linking, for example by incorporation of small amounts i.e. less than about 5%, of an aliphatic triol, such as trimethylolpropane, into the polymer composition. This is an optional embodiment within the scope of the invention.

The following examples are set forth for purpose of illustration only and are not to be construed as limitations on the present invention except as set forth in the appended claims. All parts and percentages are by weight unless otherwise specified.

EXAMPLE 1

Preparation of Polythiodiethanol Precondensate

The following is charged to a reaction vessel:

|  | Parts of weight |
|---|---|
| Thiodiethanol | 18000 grams |
| Diethyleneglycol | 1000 grams |
| Trimethylolpropane monoallyl ether | 1000 grams |
| Phosphorous acid (0.25%) | 50 grams |

The reaction mixture is heated for 9.5 hours at 190° C, distilling water as formed. A vacuum is then applied to remove the last traces of water. A total of 3600 ml. of distillate is recovered, of which 650 ml. is an oil. The yield of residual product, based on the weight of initial charge is 82%. Cyclic by-product (oily layer) represents 3.25% of the initial charge. The product is a syrup-like oligomeric precondensate, having a molecular weight of about 1200.

EXAMPLE 2

Preparation of High Molecular Weight Polythiodiethanol Elastomer

A portion of the low molecular weight oligomeric precondensate of Example 1 is heated for 18–20 hours at 170°–175° C and 5–6 mm Hg, distilling water as formed. A gum is obtained in about 30 percent yield.

This example illustrates the ineffectiveness of phosphorous acid in catalyzing the condensation to a high molecular weight elastomeric gum.

EXAMPLE 3

To 1737 grams of the precondensate of Example 1 was added 4 ml. of 3.5M $H_2SO_4$ (0.088%). The reaction mixture was then heated to 190° C and 1–2 mm Hg for about 3 hours. There was obtained 1494 grams of a tough elastomeric gum having a Mooney value (ML-4 at 212° F) of 42.5. Yield was 86% based on initial charge of precondensate.

EXAMPLE 4

To 1868 grams of the precondensate of Example 1 was added 3 ml. of 3.5M $H_2SO_4$ (0.065%). The reaction mixture was heated at 190° C and 1–2 mm Hg for about 2.5 hours. There was obtained 1529 grams of a tough elastomeric gum having a Mooney value of 34.5. Yield was 86.5%, based on initial charge of precondensate.

EXAMPLE 5

To 1895 grams of the precondensate of Example 1 was added 1 ml. of 3.5M $H_2SO_4$ (0.022%). The reaction mixture was heated at 200°–210° C and 1–3 mm Hg for about 3.75 hours. There was obtained 1708 grams of elastomeric gum having a Mooney value of 50.5. Yield was 90%, based on initial charge of precondensate.

EXAMPLE 6

The procedure of Example 3 is repeated except that the diethylene glycol and trimethylolpropane monoallyl ether are omitted from the monomer charge. Again an elastomeric gum is produced at high yield.

EXAMPLE 7

The procedure of Example 3 is again followed except that the diethylene glycol is omitted. The elastomeric gum produced is recovered in high yield.

EXAMPLE 8

Again the procedure of Example 3 is followed. The charge comprises only thiodiethanol and diethylene glycol. An elastomeric gum is recovered at high yield.

EXAMPLE 9

The procedure of Example 4 is followed except that the monomer charge comprises 82.5 grams of thiodiethanol, 10.0 grams of the dihydroxyethyl ether of hydroquinone and 7.5 grams of trimethylolpropane, monoallyl ether. A high yield of tough, elastomeric gum is recovered.

EXAMPLE 10

The procedure of Example 5 is again followed except that the monomeric charge comprises 95.0 grams thiodiethanol and 5 grams of 3-cyclohexene-1,1-dimethanol. Again a high yield of elastomeric gum is produced.

EXAMPLE 11

When the procedure of Example 3 is repeated except that the charge comprises 176 grams of thiodiethanol, 14 grams of trimethylolpropane, monoallyl ether and 10 grams of p-xylene-α,α'-diol, a high yield of elastomeric gum is recovered.

EXAMPLE 12

A mixture of 1934 grams of thiodiethanol, 206 grams of the monoallylether of trimethylolpropane, 6 grams of a commercially available antioxidant and 12 grams of phosphorus acid is heated for 4 hours at 190° C under a nitrogen atmosphere and then for 30 minutes at 150° C/25 inches vacuum. To 720 grams of the resulting copolymer are added 180 grams of isopropylidenebisphenol and 2.2 grams of phosphoric acid. The mixture is heated at 190° C/10 mm. Hg for 2 hours. About 360 grams of the resulting precondensate syrup are blended with 0.098% of 3.5M sulfuric acid. The reaction mixture is then heated to 170° C for about 4 hours. A rubbery gum is recovered in high yield.

EXAMPLE 13

The procedure of Example 12 is again followed except that the monoallylether of trimethylolpropane is omitted. The thiodiethanol is heated in the presence of 0.1% of phosphorous acid at 195° C for 5 hours and the isopropylidenebisphenol is then added. The reaction mixture is then heated to 220° C/15 mm. Hg for 1 hour in the presence of 0.065% 3.5M sulfuric acid. A rubbery gum is recovered in excellent yield.

EXAMPLES 14 and 15

Replacing the isopropylidenebisphenol of Example 12 with (14) hydroquinone and (15) resorcinol achieve substantially identical results.

EXAMPLE 16

The incorporation of 1.0% of trimethylolpropane into the monomer charge of Example 5 results in the production of a slightly cross-linked, elastomeric gum of increased molecular weight.

I claim:

1. A process for the preparation of a thiodiethanol-based elastomer composition which comprises condensing a monomer charge comprising thiodiethanol, or a major proportion of thiodiethanol with (A) one or more saturated or unsaturated aliphatic diols, or (B) one or more dihydric phenolic compounds or (C) mixtures of (A) and (B) at a temperature above about 150° C in the presence of from about 0.1 to 3 percent by weight, based on the weight of said monomer charge, of phosphorous acid, to provide an oligomeric precondensate having a molecular weight in the range of about 500 to 5000, said precondensate being fluid at temperatures above about 100° C; adding to said precondensate from about 0.01 to 0.1 percent by weight, based on the weight of said precondensate, of sulfuric acid and continuing the condensation reaction at a temperature in the range of about 150° C to 220° C until the condensate attains a molecular weight sufficient to provide a Mooney viscosity of at least about 10.

2. A process according to claim 1 wherein the molecular weight of said oligomeric precondensate is in the range of from about 1500 to 3000.

3. A process according to claim 2 wherein the condensation reaction is conducted in the presence of sulfuric acid at a temperature in the range of about 170°–200° C.

4. A process according to claim 3 wherein said condensation reaction is conducted at a pressure less than about 50 mm Hg.

5. A process according to claim 1 wherein the Mooney viscosity of said condensate is in the range of about 25 to 50.

6. The process of claim 1 wherein said copolymer of thiodiethanol is represented by the formula:

wherein ─OG─ comprises randomly alternating structural units (I) and (II):

wherein R is one or more radicals which are the residues remaining on removal of two aliphatic hydroxyl groups from diols selected from (a) saturated linear, branched chain or cyclic diols, (b) linear, branched chain or cyclic diols containing external unsaturation in the form of a group having an allylic hydrogen atom or (c) mixtures of (a) and (b); being characterized in that (1) n is an integer sufficient to provide a molecular weight of at least about 8000; (2) the molar ratio of structural units (I) to structural units (II) is not less than 1 and (3), in any event, said structural units ─OG─ contain no more than about 10 mole percent of said external unsaturation.

7. A process according to claim 6 wherein the molecular weight of said oligomeric precondensate is in the range of from about 1500 to 3000.

8. A process according to claim 7 wherein said condensation reaction is conducted in the presence of sulfuric acid at a temperature in the range of about 170°–200° C.

9. A process according to claim 8 wherein said condensation reaction is conducted at a pressure less than about 50 mm Hg.

10. A process according to claim 9 wherein the Mooney viscosity of said condensate is in the range of about 25 to 50.

11. The process of claim 1 wherein said copolymer of thiodiethanol is represented by the formula:

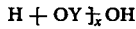

wherein ─OY─ comprises randomly alternating structural units (III), (IV) and, optionally, (V)

wherein $R^1$ represents the residue remaining on removal of two phenolic hydroxyl groups from a dihydric phenolic compound and $R^2$ represents one or more radicals which are the residues remaining on removal of two hydroxyl groups from diols selected from (d) saturated, linear, branched chain or aliphatic diols, (e) linear, branched chain or aliphatic cyclic diols containing external unsaturation in the form of a group having an allylic hydrogen atom or (f) mixtures of (d) and (e), being characterized in that (4) the molar ratio of structural units (III) to structural units (IV), or, optionally, to the total of structural units (III) and (IV), is not less than 1, (5) x is an integer sufficient to provide a molecular weight of at least about 8000 and (6) in any event, said structural unit ─OY─ contains no more than about 10 mole percent of said external unsaturation.

12. A process according to claim 11 wherein the molecular weight of said oligomeric precondensate is in the range of from about 1500 to 3000.

13. A process according to claim 12 wherein the condensation reaction is conducted in the presence of sulfuric acid at a temperature in the range of about 170°–200° C.

14. A process according to claim 13 wherein said condensation reaction is conducted at a pressure less than about 50 mm Hg.

15. A process according to claim 14 wherein the Mooney viscosity of said condensate is in the range of about 25 to 50.

* * * * *